BEAM SWITCHING TUBE LOGIC CIRCUIT

Filed Dec. 21, 1959

INVENTOR
THOMAS B. HORGAN
BY Geoffrey Knight
ATTORNEY

United States Patent Office 3,001,712
Patented Sept. 26, 1961

3,001,712

BEAM SWITCHING TUBE LOGIC CIRCUIT

Thomas B. Horgan, Endwell, N.Y., assignor to International Business Machines Corporation, New York, N.Y., a corporation of New York Filed Dec. 21, 1959, Ser. No. 861,004
6 Claims. (Cl. 235—176)

This invention relates to logic circuits, and more particularly to logic circuits using multiposition beam switching tubes.

The preferred embodiment of this invention is a binary full adder circuit, but it will be shown that this is just one application of a basic circuit which, with minor modifications, can perform many logical operations.

Previous beam tube circuits for performing logical operations have generally been of the cathode-ray or other grid-controlled variety. These tubes have required the continuous application of the input data on the grids of the tube to maintain the beam position.

The beam switching tube used in this invention is of the type which employs an electromagnetic field to bias the beam so that it shifts always in one direction. Commercially available tubes of this type are the Burroughs 6700 and 6701. Their construction and operation are disclosed, for example, in the Sin-Pih Fan et al. Patent 2,721,955, dated October 25, 1955. This type of tube has been used heretofore primarily in decimal counters.

It is therefore a general object of this invention to provide a basic beam switching tube circuit which can easily be modified to perform many logical operations.

Another object is to provide a basic logic circuit having a minimum of active elements which is capable of simultaneously performing at least two of a variety of logical operations on two or three inputs.

Still another object is to provide a logic circuit of the type described above which is capable of storing the results of an operation performed by the circuit for as long a period of time as this information is desired.

Further objects of this invention are to provide a compact highly reliable binary full adder circuit requiring a minimum number of components, and to provide a beam switching tube adder circuit which will operate at reasonably high speeds.

In accordance with these objects, this invention utilizes as an essential element a beam switching tube having a plurality of output targets. Each of the targets has a locking grid or spade and a switching grid associated with it. A drop in potential on any one of the spades causes an electron beam, which can rotate in only one direction, to advance to the target associated therewith. The beam will then remain locked in this position until switched out by some other means. Lowering the potential on a switching grid will cause the beam to advance to the next adjacent position. A half adder is obtained by initially setting the beam to a start position, impressing the individual sum inputs on alternate spades and connecting the target outputs associated with these spades to a sum output line. The two sum inputs are impressed through an "AND" gate on a spade which is at least two positions advanced from the last spade on which one of the sum inputs was impressed. The target associated with this spade is tied to a carrying output line. This half adder is expanded into a full adder by impressing the carrying input on the switching grids associated with the start position and with each of the target outputs used in the half adder circuit. This will, in each case, switch the beam to the next adjacent position. The outputs from these positions are respectively coupled to the appropriate output line.

This adder circuit can be modified to perform any other logical operation on either two or three inputs by tying the target outputs together in the proper manner. Since the beam, once switched to a given position, will remain in that position until switched out, the circuit serves as a storage device for the impressed input data.

The foregoing and other objects, features and advantages of the invention will be apparent from the following more particular description of a preferred embodiment of the invention, as illustrated in the accompanying drawings.

Figure 1:
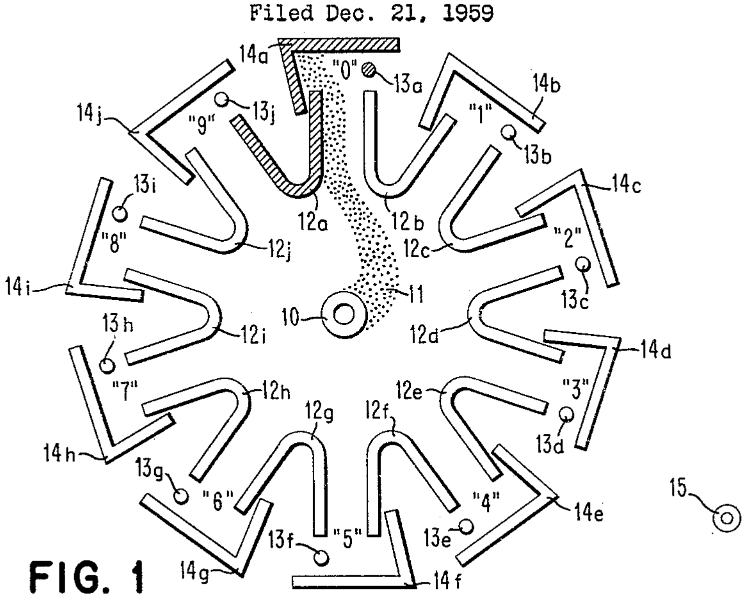
FIG. 1 is a somewhat diagrammatic cross sectional view of a beam switching tube used in the preferred embodiment of this invention.

The multiposition beam switching tube shown in FIG. 1 is of the commercial type previously mentioned. In the following discussion of the tube 9, a reference numeral with a subscript letter will be used to designate a specific element of the tube 9, while a numeral without a subscript will designate all elements of a particular type.

The tube 9 has a cylindrical cathode 10 which is surrounded by ten symmetrically positioned electrode units. Each of these units comprises a V shaped spade electrode 12 which is normally maintained at a potential which is considerably positive with respect to the cathode, a cylindrical switching grid 13 which is also normally maintained at a positive potential, and a target electrode 14 which is also maintained at a higher positive potential than the cathode.

The potential of the elements is such as to cause a symmetrical electrostatic field in the tube 9 which tends to draw electrons from the cathode 10 to the spades 12. This tendency of the electrons to migrate is normally overcome by a cross magnetic field the direction of which is shown by the line of force at 15, this magnetic field being caused by a concentric cylindrical magnet (not shown). The electrons are confined to the space between the cathode 10 and the spades 12 and are caused to rotate in curved paths about the cathode 10, the direction of rotation depending on the polarity of the magnetic field.

If, however, the potential of one of the spades 12 is lowered to near cathode potential, the symmetry of the electric field is changed, modifying the effect of the magnetic field to allow spiraling electrons to be attracted in the direction of the spade having the lowered potential. Most of these electrons are influenced by the relatively high potential of the associated target 14 to flow past the down spade 12 and to impinge on the target 14, forming the electron beam 11.

A detailed description of the characteristics and properties of the beam switching tube 9 will be found in the before mentioned Patent 2,721,955. The particular properties of this tube 9 which are utilized in this invention are:

(1) When the tube is initially turned on, with all the spades 12 and switching grids 13 positive, no beam is formed.

(2) If the potential on any spade 12 is lowered, the beam 11 forms there and locks, holding that spade 12 (and associated target) down.

(3) If a spade 12 located 1, 2, 3 or 4 positions clockwise from that which is down is lowered, the beam 11 will transfer to this new spade. If the potential of a spade 12, located five to ten positions clockwise from that which is down is lowered, no transfer of the beam 11 will occur. With the direction of the magnetic fields as shown at 15 in FIG. 1 the beam 11 will rotate only in the clockwise direction.

(4) Lowering the potential of a switching grid 13 associated with a down spade 12 causes the beam 11 to transfer clockwise to the next adjacent spade. Lowering the potential of any other grid 13 has no effect on the beam 11.

(5) Targets 14 are isolated pentode-like outputs. Target potentials have no effect on the position of the beam 11.

Figure 2:
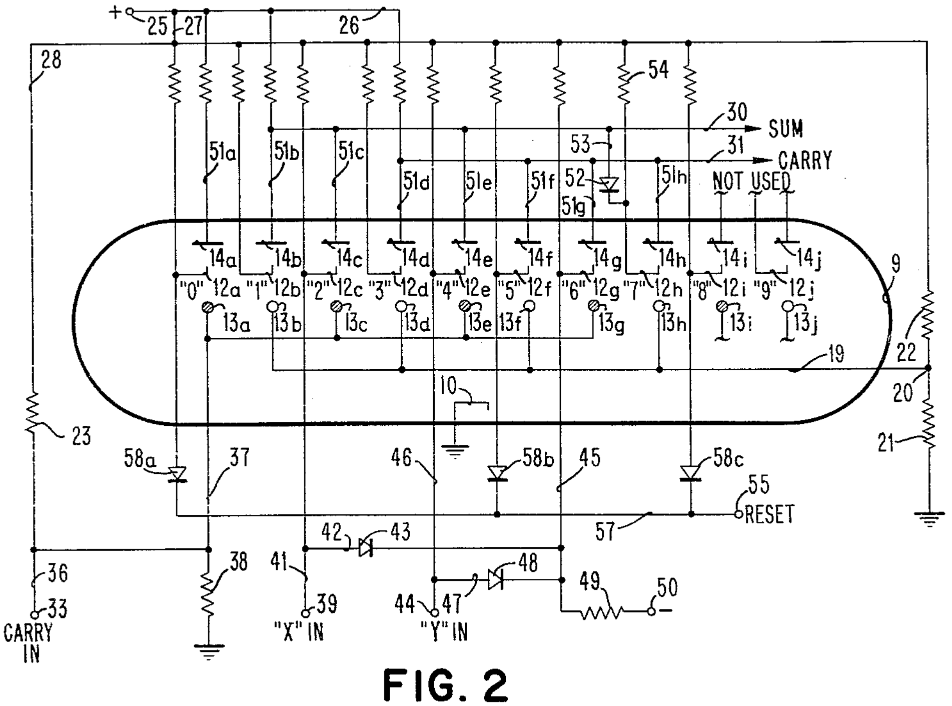
FIG. 2 is a schematic representation of the binary full adder circuit which is the preferred embodiment of the invention.

These properties of the beam switching tube are utilized in the circuit of FIG. 2 to produce a binary full adder.

This circuit has three input terminals and two output terminals. The X input terminal 39 is connected by the line 41 to the 2 spade 12*c*. If a negative level is impressed on this terminal the potential of the 2 spade 12*c* will be lowered. The Y input terminal 44 is connected by the line 46 to the 4 spade 12*e*. A negative level on this terminal is impressed on the 4 spade 12*e* to pull the spade down.

The X and the Y inputs are also fed to the lines 42 and 47 respectively and through a conventional diode "AND" circuit formed by diodes 43 and 48 to pull down the 6 spade 12*g* and shift the beam 11 to the 6 position when both inputs are present. When either of the inputs X or Y is not present, the minus potential at terminal 50 combines with the positive potential from the missing input terminal to forward bias the associated diode, 43 or 48. This will clamp the potential on line 45 at the positive potential of a missing input and will overcome the tendency of any negative input caused by one of the inputs being present or of the negative biasing source 50 to pull the 6 spade 12*g* down.

The carry input terminal 33 is connected by lines 36 and 37 to switching grids 13*a*, 13*c*, 13*e*, and 13*g*, the switching grids for positions 0, 2, 4, and 6 respectively. A negative level on this input will therefore serve to lower the potential on the before mentioned switching grids. The beam 11, if located at one of the positions associated with these grids, will be shifted in the clockwise direction to the next adjacent position. The switching grids 13*b*, 13*d*, 13*f*, and 13*h*, the switching grids associated with the 1, 3, 5, and 7 positions respectively, are connected by the line 19 to the terminal 20 maintaining these grids at a positive potential. The positive potential at terminal 20 is maintained by the voltage divider network of the resistor 22 to the positive potential source 25 and the resistor 21 to ground.

Targets 14*b*, 14*c*, and 14*e*, the targets for the 1, 2, and 4 positions, respectively, are connected directly to the sum output line 30, causing a negative output level on this line when the beam is located at either the 1, 2, or 4 position. The sum line 30 is also connected to the 7 spade 12*h* by the line 53 to give an output on the sum line when the beam is at the 7 position. The diode 52 is required to prevent spurious beam transfer to the 7 position due to a negative output on the sum line from the 4 position.

The carry output line 31 is connected directly to the targets 14*d*, 14*f*, 14*g*, and 14*h*, the targets for positions 3, 5, 6, and 7 respectively, causing a negative output level to appear on the line 31 when the beam 11 is located at any of these positions.

The positive potential source 25 applies a positive bias to the targets 14 through the line 26 and the associated line 51 or through line 26, line 30 or 31 and the associated line 51. Since, as previously mentioned, the target potentials have no effect on the beam position, the reduction in the bias potential of all the targets connected to the line (30 or 31) which has an output does not cause any change in the position of the beam 11.

The positive potential source 25 also applies a positive bias to the spades 12 through the lines 26, 27 and 28.

A negative reset pulse applied to terminal 55 is transmitted along the line 57 to be impressed simultaneously on spades 12*a*, 12*f*, 12*i*, the spades for positions 0, 5, and 8 respectively. This pulls down these spades and in this way causes the beam 11 to be advanced to the 0 position from whichever other position it might be in, in a manner to be described presently. The diodes 58 are required to isolate these spades from each other, so as to prevent erroneous beam shifting.

From FIG. 2 and the following discussion, it will be seen that the last two positions of the tube 9 are not active in the circuit of the invention. The tube 9 must have at least ten positions, however, in order to provide the required four-position isolation between position seven and position two. Commercial versions of this tube are presently decimal, and exhibit four-position advance under spade control. A tube exhibiting two-position advance under spade control would require only eight positions.

The circuit operates in the following manner:

The beam 11 is initially set to the 0 position by any one of a number of acceptable means. The method shown in FIG. 2 is to apply a negative pulse to the 0 spade 12*a*, 5 spade 12*f*, and 8 spade 12*i* simultaneously. If the beam 11 is initially located at the 1 through 4 position, the 5 spade 12*f* being down will advance the beam 11 to the 5 position; if the beam 11 is located at the 5 through the 7 positions, the 8 spade 12*i* being down will advance the beam 11 to the 8 position; and if the beam is located at the 8 or the 9 position, the 0 spade 12*a* being down will advance the beam to the 0 position. Since a spade 12 being down will advance beam 11 no more than four positions in the clockwise direction, and the closest down spade in the clockwise direction from the 0 position is the 5 spade 12*f*, the beam 11, on arriving at the 0 position, will be able to advance no further and will lock in at that position.

The same result would be obtained if the 6 spade 12*g*, 7 spade 12*h*, or 9 spade 12*j* were pulled down rather than the 8 spade 12*i*.

The beam 11 might also be set to the 0 position by turning the beam off, and then reforming the beam at the 0 position by lowering the potential of the 0 spade 12*a* to near cathode potential.

If with the beam 11 at the 0 position, a negative pulse is applied to the X input terminal 39, the 2 spade 12*c* will be pulled down. This causes the beam 11 to be advanced from the 0 to the 2 position, lowering the potential of the 2 target 14*c*. The lowered potential of target 14*c* causes a negative output level on the sum output line 30.

If with the beam 11 at the 0 position, a negative pulse is applied at the Y input terminal 44 the 4 spade 12*e* will be pulled down and the beam 11 shifted to the 4 position. The drop in potential at the 4 target 14*e* causes a negative output level on the sum output line 30.

And if, with the beam 11 at the 0 position, negative pulses are applied to the both the X input terminal 39 and the Y input terminal 44, the 2 spade 12*c* and the 4 spade 12*e* will both be pulled down, and the 6 spade 12*g* will be pulled down by the action of the "AND" gate formed by the diodes 43 and 48 in a manner already explained. The beam 11 will therefore be switched from the 0 position to the 2 position, from the 2 position to the 4 position, and from the 4 position to the 6 position, locking in the 6 position. This lowers the potential of the 6 target 14*g* to cause a negative output level on the carry output line 31.

This much of the circuit is a complete binary half adder and could be used as such where this logical element is required. If only the sum output line 30 is used on this much of the circuit, an "exclusive OR" logical circuit is formed.

This half adder is expanded into a full adder by taking the negative carry pulse from terminal 33, and applying it to alternate switching grids as explained before.

With the beam 11 initially located at the 0 position, the desired outputs are obtained in the following manner:

An input on the carry terminal 33 alone will pull down, among others, the 0 switching grid 13*a*, causing the beam 11 to advance to the 1 position. The beam 11 being at the 1 position, lowers the potential of the 1 target 14b, and this reduced potential is transmitted through the line 51b to the sum output line 30, causing the desired negative output level.

Inputs to the X terminal 39 and the carry terminal 33 will pull down the 2 spade 12c, and the switching grids 13 for positions 0, 2, 4, and 6. The 0 switching grid 13a being down will step the beam 11 to the 1 position, the 2 space 12c being down will pull the beam 11 to the 2 position, and the 2 switching grid 13c being down will advance the beam 11 to the 3 position where it will lock in. The potential of the 3 target 14d will be reduced causing the desired negative output level on the carry output line 31.

A similar chain of events will occur if positive input pulses are impressed on the Y terminal 44 and the carry terminal 33. For these inputs, the beam 11 will ultimately advance to the 5 position where it will lock in. The lowered potential of the 5 target 14f will cause the desired negative carry output level to appear on the carry output line 31.

Input pulses to all three input terminals 33, 39, and 44 will advance the beam 11 in a manner similar to that already described, the final step resulting from the 6 switching grid 13g being down causing the beam 11 to advance to the 7 position. The beam 11 locks in the 7 position lowering the potential on both the 7 spade 12h and the 7 target 14h. The former drop in potential is transmitted through diode 52 and line 53 to line 30 to give the required negative sum output level, while the latter drop in potential is transmitted through line 51h to line 31 to give the required negative carry output level.

It can now be seen that if the beam 11 is set at the 0 position the input circuitry shown in FIG. 1 is capable of accepting any combination of two or three input pulses and of giving a continuous level output on a separate line 51 for each such combination. One can therefore, by tying suitable ones of the targets 14 together, form any desired gating circuit.

There are several great advantages in using the beam switching tube 9 for gating purposes. One of these advantages is that a single beam switching tube 9 can be used to simultaneously perform more than one gating function on the inputs. This is accomplished as shown in FIG. 2, by tying the targets 14 of a single beam switching tube 9 together with a number of lines in a variety of ways. The number of functions which can be performed by a single tube is limited only by the fact that if more than two outputs are taken from a single position, it is not possible to isolate the output lines from each other.

Another great advantage of these circuits is that, having a continuous level output, they perform simultaneously both gating, the combining of a number of inputs to give the desired output function, and with storage, the maintenance of a steady state output potential level. A pulse input will shift the beam 11 to the desired position; this done, the beam 11 will automatically lock in at that position and will reduce the potential of the target 14 of that position to generate a continuous level output which will be maintained until the beam is reset or switched to some new position.

The above described action entails the advantage of providing an inherent memory action in the tube so that once input data has been received and the beam position set, the tube 9 will store this data until it is reset or until new data is received. The continuous level output signal makes possible non-destructive sensing of this stored data when desired.

While the invention has been particularly shown and described with reference to a preferred embodiment thereof, it will be understood by those skilled in the art that the foregoing and other changes in form and detail may be made therein without departing from the spirit and scope of the invention.

I claim:

1. A basic logical element for deriving a desired output function, comprising a beam switching tube, said tube having beam directing means for forming and maintaining an electron beam in any one of a plurality of stable positions, a plurality of output targets associated each with a different one of said stable positions, each of said targets being located so as to be impinged upon by said beam when the beam is in the related stable position, said beam directing means comprising means including a plurality of locking means each for advancing said beam to related one of said stable positions and holding it there, means including said locking means for initially setting said beam to a first one of said stable positions, first input means adapted to impress a signal on one of said locking means for advancing said beam to a second stable position, second input means adapted to impress a signal on a second one of said locking means for advancing said beam to a third one of said stable positions, means for activating a third one of said locking means in response to the combined action of signals on both of said input means to advance said beam to a fourth one of said positions, and means for coupling selected ones of said output targets to derive therefrom a desired output function.

2. A circuit as described in claim 1, characterized by a plurality of switching means associated with respective ones of said stable positions for stepping said beam from their respective associated positions to the next adjacent position; and third input means for impressing a signal on the switching means associated with said first, second, third, and fourth stable positions, said first, second, third, and fourth stable positions being separated from each other by intermediate positions to which the beam is advanced by said switching means.

3. A circuit as described in claim 1, characterized by a means for deriving a second output function different from said before mentioned output function, said means including means for connecting selected target outputs not coupled by said coupling means and means for connecting selected locking means associated with targets coupled by said coupling means.

4. A circuit as described in claim 3 wherein said means for connecting selected locking means includes rectifying means for preventing spurious beam transfer.

5. A basic logical element for obtaining different desired output functions, comprising a beam switching tube having a plurality of output targets, means for generating an electron beam, and beam directing means for directing said beam to any one of said targets; said beam directing means comprising locking means and switching grids; there being a plurality of individual locking means respectively associated with different non-adjacent ones of said output targets and a plurality of switching grids respectively associated with said same targets, each of said locking means being adapted, when made effective, to draw the electron beam to its related output target, and each of said switching grids being adapted, when made effective, to switch the beam from its related output target to the next adjacent output target; reset signal means for switching the beam to a first one of said locking means and the related output target; first input means adapted to impress a signal on a second one of said locking means to cause the electron beam to be drawn to the output target pertaining to said second locking means; second input means adapted to impress a signal on a third one of said locking means to cause the electron beam to be drawn to the output target pertaining to said third locking means; means responsive to signals impressed concurrently on said first and second input means for impressing a signal on a fourth one of said locking means to cause the electron beam to be drawn to the output target pertaining to said fourth locking means; input means for impressing a signal concurrently upon switching grids associated with said first, second, third, and fourth locking means to cause the electron beam to be switched from any one of said output targets to the next adjacent output target; and means coupling different groups of said output targets together to derive therefrom the different desired output functions.

6. A binary full adder circuit comprising a beam switching tube having beam directing means for forming and maintaining an electron beam at any one of a plurality of stable positions; a plurality of output targets associated each with a different one of said stable positions, each of said targets being located so as to be impinged upon by said beam when the beam is in the related stable position; said beam directing and maintaining means including a plurality of locking means for advancing said beam to respective ones of said stable positions and holding it there; and a plurality of switching means associated with respective ones of said stable positions for stepping said beam from their respective associated positions to the next adjacent position; means including said locking means for initially setting said beam to a first one of said stable positions; means for impressing a first input signal on one of said locking means to advance the beam to a second one of said stable positions; means for impressing a second input signal on a second one of said locking means to advance said beam to a third one of said stable positions; means responsive to the presence of signals on both of said input means for activating a third one of said locking means to advance said beam to a fourth one of said stable positions; said first, second, third and fourth positions being separated from each other by intermediate positions, means for impressing a carry input signal on the switching means associated with said first, second, third, and fourth positions to advance said beam when it is at one of these positions to the respective next adjacent position; sum output means for coupling the targets said beam impinges upon when only one of said inputs is present, carry output means for coupling the targets said beam impinges upon when only two of said inputs are present, means coupling the target said beam impinges upon when all of said inputs are present to one of said output means, and means coupling the locking means associated with said last mentioned target to the other of said output means.

References Cited in the file of this patent

UNITED STATES PATENTS

| | | |
|---|---|---|
| 2,721,955 | Sin-Pih Fan et al. | Oct. 25, 1955 |
| 2,795,732 | Kuchinsky | June 11, 1957 |
| 2,848,647 | Kuchinsky et al. | Aug. 19, 1958 |
| 2,899,551 | Seif | Aug. 11, 1959 |

OTHER REFERENCES

Haydu Engineering Data Report, 6700, June 1, 1955, No. 100.